Dec. 17, 1968  S. BRYANT  3,417,213
PLUG AND SOCKET CONNECTOR FOR ELECTRIC CIRCUITS
Filed Dec. 30, 1966  2 Sheets-Sheet 1

INVENTOR
STANLEY BRYANT
By Mullman and Jacobs
ATTORNEYS

Dec. 17, 1968  S. BRYANT  3,417,213
PLUG AND SOCKET CONNECTOR FOR ELECTRIC CIRCUITS
Filed Dec. 30, 1966  2 Sheets-Sheet 2

INVENTOR
STANLEY BRYANT
By Millman and Jacobs
ATTORNEYS

United States Patent Office 3,417,213
Patented Dec. 17, 1968

3,417,213
PLUG AND SOCKET CONNECTOR FOR
ELECTRIC CIRCUITS
Stanley Bryant, 221 Victoria St., Taree,
New South Wales, Australia
Filed Dec. 30, 1966, Ser. No. 606,469
Claims priority, application Australia, Apr. 5, 1966,
3,873/66
9 Claims. (Cl. 200—51)

ABSTRACT OF THE DISCLOSURE

A plug and socket connector for connecting electrical circuits on a towing vehicle to corresponding circuits on a trailing vehicle to be towed by said towing vehicle. The plug and socket are substantially the same shape. The socket is mounted on the towing vehicle and has a hinged lid which acts as a switch and in a closed position, where it prevents the engagement of the plug in the socket, it connects a resistor into a circuit of the towing vehicle to be connected to the trailing vehicle. With the lid in the raised position the plug can be engaged in the socket and the resistor is switched out of said circuit.

---

This invention has been devised to provide a plug and socket connector which is particularly adapted for use on motor vehicles so as to extend the electrical circuits of selected equipment thereon to include the corresponding equipment on a vehicle being towed.

Although of the type subject of Australian patent application No. 48,327/64 by Bryant Motors (Taree) Pty. Limited, the plug and socket connector of this invention unlike the connector of patent application No. 48,327/64 makes it possible to directly incorporate blinking light turning indicators on a towed vehicle in the corresponding indicator circuits on the towing vehicle irrespective of the type of flasher unit used in the towing vehicle blinking indicator system. A very common type of flasher unit has an inbuilt switch which opens and closes to turn the selected indicators on and off at a rate dependent upon the current flowing through the flasher to the indicators. Simply adding an additional indicator from a towed vehicle to a corresponding towing vehicle indicator circuit fitted with this common type of flasher unit causes a change of the speed and the tell-tale lamp provided to inform the driver when any one signal light at which the indicators go on and off, ceases to function, due to the increase or decrease in current passing through the flasher unit. As the rate referred to is usually the subject of government regulation it has been found necessary to provide means whereby the rate is maintained substantially constant irrespective of whether a towed vehicle indicator is or is not connected into the corresponding indicator circuit of the towing vehicle.

It is therefore the object of the present invention to provide a plug and socket connector of the type referred to in which the plug and socket have coacting male and female contacts respectively and the connector member on the towing vehicle includes switch means whereby a resistor automatically is connected into and is automatically disconnected from a towing vehicle circuit coupled to said connector member whenever the connector members are uncoupled and coupled respectively.

It is a further object to provide a plug and socket connector in which the plug and the socket are substantially the same rectangular shape and are of shallow depth so that the connector member mounted on the towing vehicle will not protrude unduly therefrom and in which the connector member mounted on the towing vehicle incorporates a means which serves both to seal the contacts thereof from the ingress of dirt and other foreign matter when the connector is uncoupled and to hold the connector members together when they are in a coupled condition.

Two forms of the invention will now be described with reference to the accompanying drawings in which.

Figure 1:
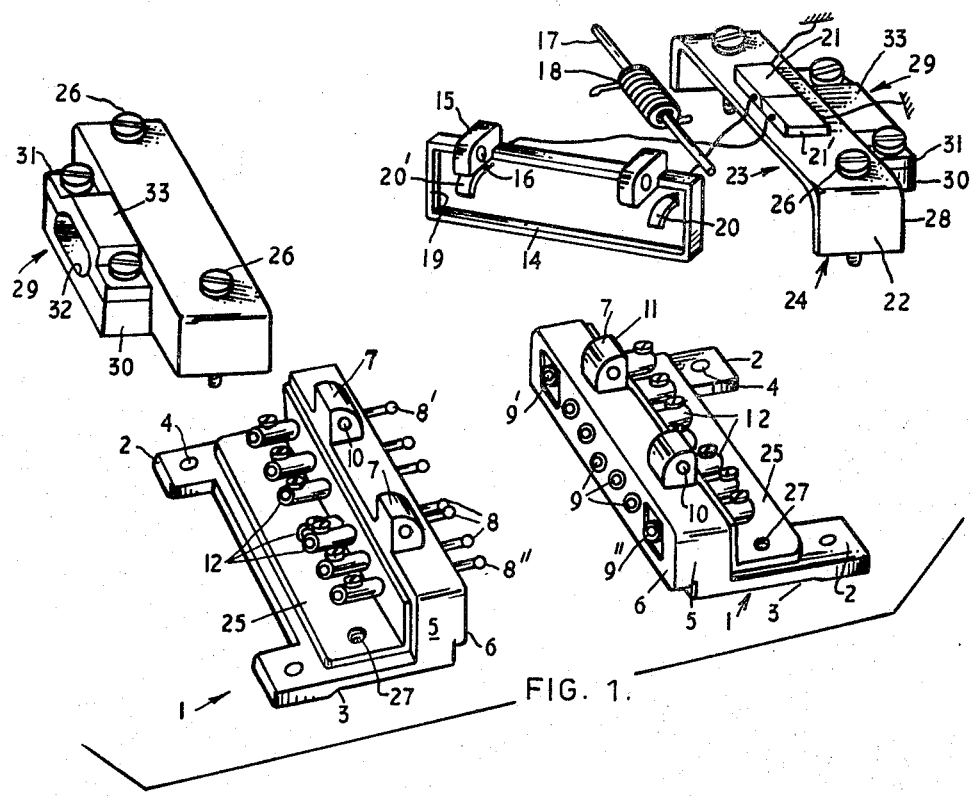
FIG. 1 is an exploded perspective view showing the components forming the plug and socket in one form of the invention.
Figure 2:
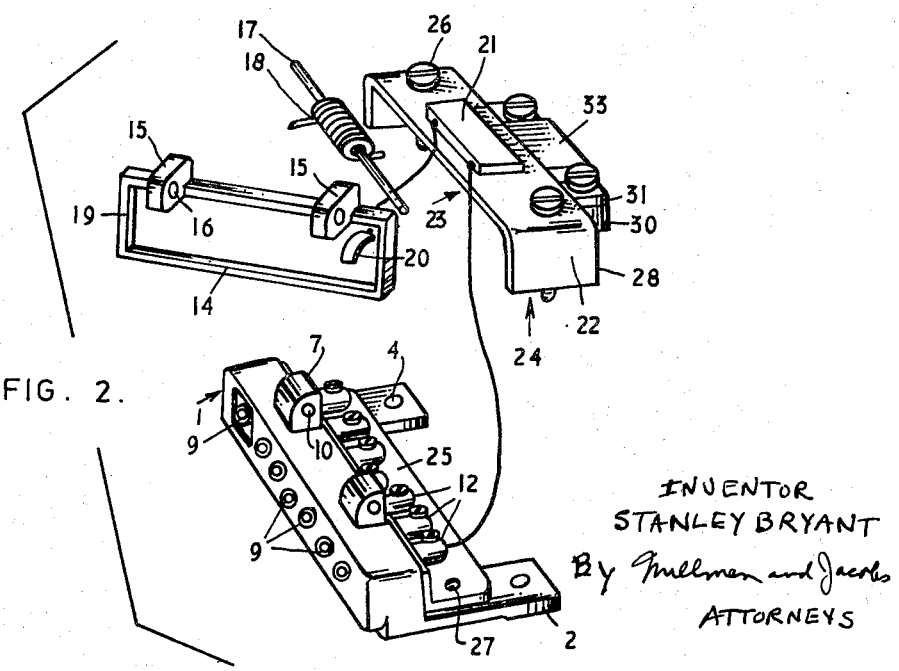
FIG. 2 is an exploded perspective view of the socket components in a second form of the invention.
Figure 3:
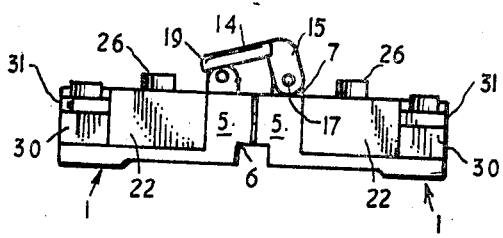
Figure 4:
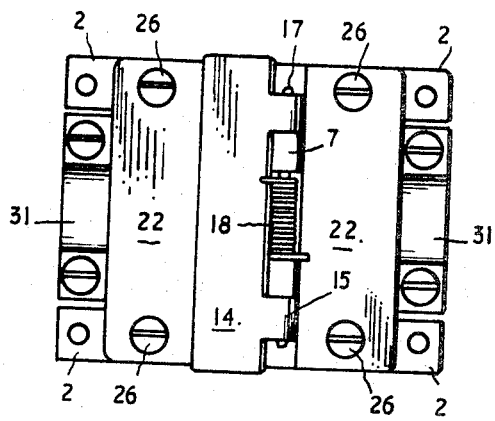
Figure 5:
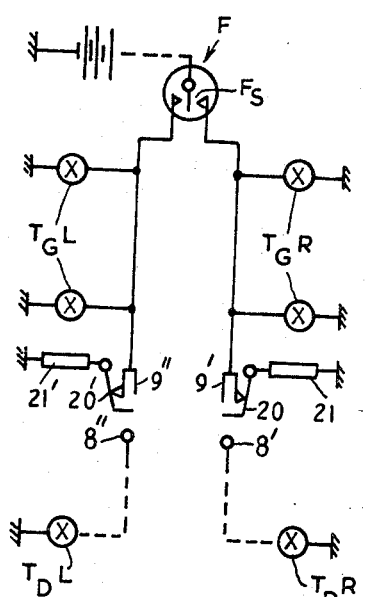
Figure 6:
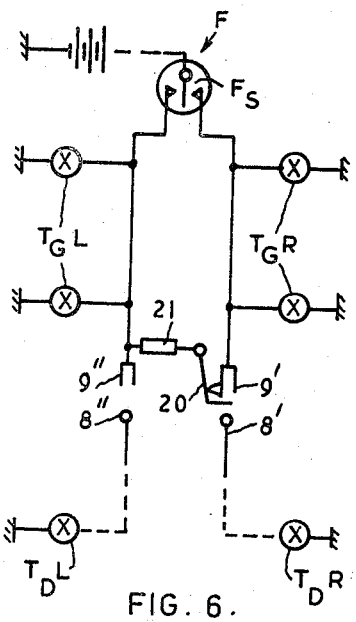

FIGS. 3 and 4 are a side elevation and a plan view of the assembled connected components of FIG. 1; and FIGS. 5 and 6 are circuit diagrams corresponding to the forms of the invention illustrated in FIGS. 1 and 2 respectively.

As illustrated in FIGS. 1 and 5 the plug and socket each include an identically formed base 1 which is L-shaped and which is rectangular in plan. The base 1 has mounting means formed as extensions 2 of one limb 3 thereof with fixing holes 4 formed through the extensions 2. The other limb 5 of the base 1 has a flat rectangular raised part 6 formed on one side thereof and has a pair of spaced lugs 7 formed on the top thereof. The limb 5 has seven spaced holes formed therethrough and through the raised part 6 to accommodate selected groups of male contacts or female contacts 8, 9 as the case may be. The middle hole is set lower than the rest so that the two parts of the connector can only be coupled in one way. The lugs 7 have aligned bearing holes 10 formed therethrough, and they also each have a catch face 11 formed thereon. The male contacts 8 and female contacts 9 are provided with socket extensions 12 each having a clamping screw therein, for connecting electric leads thereto.

The lid 14 is hingeably mounted on the female contact socket member of the plug and socket assembly. It has outwardly projecting brackets 15 formed thereon which have holes 16 formed therethrough to register with the holes 10. A shaft 17 fixed in the lugs 7 has the lid brackets rotatable thereon and a helical spring 18 mounted on the shaft 17 between the lugs 7, has one end thereof in engagement with the lid 14 and has the other end thereof in engagement with the top of the limb 5. The lid 14 has a flat rectangular body part dimensioned to abut and cover the raised part 6 in face to face relationship to occlude the female contacts 9, and it also has flanged sides 19 surrounding the flat body part thereof and the flanged sides 18 surrounding the raised part 6 when the lid is closed.

One long flanged side 19 of the lid 14 acts as a hook for engagement with the catch faces 11 when the plug and socket are connected, and by this arrangement the hook and catches hold the plug and socket in the connected position under the action of the spring 18. To disconnect the plug and socket the lid 14 must be raised to clear the flanges 19 from the catch faces 11 against the action of the spring 18, and when the plug and socket are disconnected the spring 18 closes the lid 14 over the female contacts 9.

The lid 14 has on its underface a leaf spring contact 20 which, when the lid closes under the action of the spring 18, engages with the end of the contact 9' around which a recess in the face 6 has been formed and through which the turning indicators for one side of the towing vehicle will be connected to the corresponding indicator on the towed vehicles by engagement by terminal 8'. The contact 20 is connected to earth through a resistor 21 mounted on a cover 22 over the extensions 12. The contacts 9' and 20 act as a switch which operates when the lid 14 is opened or closed to permit the connection and disconnection of the connector members.

Resistor 21 has a power rating substantially equal to the power rating of the indicator (T$d$R or T$d$L) to be illuminated on the towed vehicle. Therefore the current drawn through the flasher when the vehicles are connected through the connector and the indicator circuit comprises the indicator lights on the towing vehicle plus the indicator light on the towed vehicle will be substantially the same as it is when the vehicles are not connected and only the indicator lights on the towing vehicle and the resistor are in circuit. The flashing rate of the indicators will therefore be substantially the same whether the plug and socket are coupled or uncoupled.

In service the members set out above will be duplicated to cater for both turning indicators and in FIG. 1 these duplicate contacts and resistor are numbered 8", 9", 20' and 21'.

The cover 22 is a hollow rectangular shell having an open side 23 which abuts the limb 5 and an open side 24 which abuts the limb 3, and it covers the pin and socket extensions 12. To accurately locate it on limb 3, a raised part 25 may be formed on said limb 3 and as illustrated it is secured to the limb 3 by screws 26 which are received in suitable screw holes 27 formed in the limb 3.

The outer wall 28 of the cover 22 has an opening 29 formed therethrough to locate electric leads passing through the cover 22 to the pin and socket extension 12. Lead clamping means are also formed externally on the wall 28 and juxtaposed the opening 29.

The lead clamping means consist of a clamp support 30 formed integrally with the cover 22 and a clamp 31 adapted to be bolted to the support 30. The clamp support 30 and clamp each have an identically shaped channel 32 formed therein and the clamp has a protuberance 33 formed thereon opposite the channel 32. The protuberance 33 is less in width than the channel 32 whereby it can be accommodated in the channel 32. In a first lead clamping position, the clamp 31 is secured to the support 30 with the channels 31 in register, thus providing an opening of similar size and shape to the opening 29. In a second lead clamping position, the clamp 31 is secured to the support 30 with the protuberance 33 projecting into the channel 32 formed on the support 30.

The form of the invention illustrated in FIGS. 2 and 6 achieves the same result as the form previously described except that only one resistor is used.

From FIGS. 2 and 6 it will be seen that there is only one contact 20 and one resistor 21 and that the resistor is wired to the contact 20 and the terminal 9" instead of earth. In this arrangement irrespective of which indicator circuit is energised on the towing vehicle the resistor will be in circuit if the plug and socket are uncoupled and the lid 14 is closed.

The resistor 21 has a resistance approximately equal to the resistance of each of the indicators of the towed vehicle to be connected into the towing vehicle circuits. From FIG. 6 it will be seen that if the two right hand indicators T$g$R of the towing vehicle are selected with the towed vehicle uncoupled a current will flow through the indicators T$g$R as well as over resistor 21 and the two left hand indicators T$g$L. The globes of the indicators have a very low resistance when cold. The current drawn by the left hand indicators T$g$L is determined by the voltage drop over the resistor 21 and as the two lamps T$g$L are in parallel the current through each lamp is not sufficient to light the lamps so that their resistance remains very low. The current flowing through the selected indicators would therefore be substantially the same as if resistor 21 was connected to earth. The same applies when the left hand indicators T$g$L on the towing vehicle are selected with the connector uncoupled.

The resistors described and illustrated can if desired be replaced by a length of cable having the desired characteristic in which case the spring contact would be directly connected to earth or to a female contact by means of the cable.

The base 1, lid 14 and cover 20 are particularly adapted to be moulded in suitable "plastic" material, thereby greatly reducing the cost of producing the connector, by comparison with the cost of known connectors. Also, the connector may incorporate a rubber sleeve if desired, to cover the joint between the plug and socket, and the arrangement of contacts may be varied to suit particular requirement.

What I claim is:

1. A plug and socket connector comprising a plug with an L shaped base forming first and second limbs and a socket having an identically shaped base, male contacts in the first limb of the plug and coacting female contacts mounted in the first limb of the socket, upstanding lugs on the first limb of each of the bases, a lid for the contacts of the socket, said lid being hingedly connected to the socket lugs, a spring engaging the lid and the socket respectively to bias the lid to a normally closed female contact covering position, locking means on the lid engageable with the lugs on the plug under the influence of the spring when the plug and socket are coupled together, at least one electrical resistor mounted on the socket, a contact spring on the inside of the lid electrically connected to the resistor and engageable with one of the socket contacts when the lid is in the normally closed position, a cover for each base detachably mounted on the second limb of the corresponding base, said covers finishing flush with the ends and sides of the limbs and an outlet in each cover to admit wires for connection to the contacts.

2. A plug and socket connector as claimed in claim 1 having two electrical resistors, two contact springs on the lid each connected to one of the resistors and each automatically engaging a socket contact when the lid is in the contact covering position.

3. A connector as claimed in claim 2 having a flat rectangular raised surface on the first limb of the socket, openings through said raised surface to permit engagement of the male contacts with the female contacts, a face on said lid for surface contact with said raised surface, an endless upstanding ridge on said lid face dimensioned to fit around said raised surface and forming said locking means.

4. A connector as claimed in claim 3 including brackets on said lid, a pivot pin passing through the lugs on the socket and the brackets on the lid, said spring being helically coiled around said shaft and torsionally stressed to bias said lid into said female contact covering position.

5. A connector as claimed in claim 4 the plug and socket eaching having a wiring clamp support formed on said cover adjacent the outlet of said cover, a groove in each clamped support aligned with the outlet, a reversible wiring clamp plate, a groove in said clamp plate, a ridge on said clamp plate, attachment means to attach the clamp plate to the clamp support with the groove of the clamp plate aligned with and opposite the groove in the clamp support or with the ridge on the clamp plate in the groove of the clamp support.

6. A plug and socket connector as claimed in claim 1 having one electrical resistor with one of its terminals electrically connected through the automatic contact spring to the corresponding female contact and its other terminal directly coupled to another of said female contacts.

7. A connector as claimed in claim 6 having a flat rectangular raised surface on the first limb of the socket, openings through said raised surface to permit engagement of the male contacts with the female contacts, a face on said lid for surface contact with said raised surface, an endless upstanding ridge on said lid face dimensioned to fit around said raised surface and forming said locking means.

8. A connector as claimed in claim 7 including brackets on said lid, a pivot pin passing through the lugs on the socket and the bracket on the lid, said spring being helically coiled around said shaft and torsionally stressed to bias said lid into said female contact covering position.

9. A connector as claimed in claim 8 the plug and socket each having a wiring clamp support formed on said cover adjacent the outlet of said cover, a groove in each clamped support aligned with the outlet, a reversible wiring clamp plate, a groove in said clamp plate, a ridge on said clamp plate, attachment means to attach the clamp plate to the clamp support with the groove of the clamp plate aligned with and opposite the groove in the clamp support or with the ridge on the clamp plate in the groove of the clamp support.

References Cited
UNITED STATES PATENTS

| | | | |
|---|---|---|---|
| 2,299,206 | 10/1942 | Berg | 339—39 |
| 3,284,753 | 11/1966 | Goldbaum | 339—44 |

ROBERT K. SCHAEFER, *Primary Examiner.*

DAVID SMITH, JR., *Assistant Examiner.*

U.S. Cl. X.R.

307—10; 339—44